United States Patent [19]
Herrmann

[11] Patent Number: 5,355,742
[45] Date of Patent: Oct. 18, 1994

[54] DEVICE FOR AVOIDING FLANK BLACKLASH IN GEAR TRAINS

[75] Inventor: Joachim Herrmann, Mannheim, Fed. Rep. of Germany

[73] Assignee: Heidelberger Druckmaschinen AG, Heidelberg, Fed. Rep. of Germany

[21] Appl. No.: 89,676

[22] Filed: Jul. 9, 1993

[30] Foreign Application Priority Data

Jul. 9, 1992 [DE] Fed. Rep. of Germany ....... 4222514

[51] Int. Cl.⁵ .................... F16H 55/18; B41F 5/16
[52] U.S. Cl. .................... 74/409; 74/665 N; 101/183
[58] Field of Search ............ 74/421 R, 409, 665 L, 74/665 N; 101/181, 183, 184; 404/97

[56] References Cited

U.S. PATENT DOCUMENTS

| | | | |
|---|---|---|---|
| 1,107,731 | 8/1914 | Vold | 74/409 X |
| 2,707,914 | 5/1955 | Harrold | 101/183 |
| 3,365,723 | 1/1968 | Spormann | 74/409 X |
| 3,477,304 | 11/1969 | Young | |
| 4,953,417 | 9/1990 | Baumgarten et al. | 74/409 |

FOREIGN PATENT DOCUMENTS

| | | |
|---|---|---|
| 1761078 | 3/1975 | Fed. Rep. of Germany . |
| 2925833 | 1/1981 | Fed. Rep. of Germany . |
| 2754429 | 6/1982 | Fed. Rep. of Germany . |
| 2707035 | 3/1986 | Fed. Rep. of Germany . |
| 1047731 | 10/1983 | U.S.S.R. . |
| 1050891 | 10/1983 | U.S.S.R. . |
| 2038717 | 7/1980 | United Kingdom . |
| 2038718 | 7/1980 | United Kingdom . |
| 1586926 | 3/1981 | United Kingdom . |

*Primary Examiner*—Leslie A. Braun
*Assistant Examiner*—David W. Laub
*Attorney, Agent, or Firm*—Herbert L. Lerner; Laurence A. Greenberg

[57] ABSTRACT

A device for avoiding gear flank backlash or chattering of first and second gear trains. Each of the gear trains include a plurality of mutually meshing gear wheels. The first gear train has a first initial wheel and a first end wheel. The first initial wheel is driven. The second gear train has a second initial wheel and a second end wheel. The second end wheel is driven. The first and second initial wheels of the first and second gear trains are non-rotatably connected to one another. A tensioning device is connected between the first and second end wheels and it produces a torque in a preferred rotational direction of the gear wheels of the first gear train. The torque acts between the first initial wheel and the first end wheel and ensures a definite flank alignment of the gear wheels during the operation of the first gear train.

12 Claims, 3 Drawing Sheets

DEVICE FOR AVOIDING FLANK BLACKLASH IN GEAR TRAINS

BACKGROUND OF THE INVENTION

1. Field of the Invention

The invention relates to a device for avoiding backlash (chattering) in gear trains of machines, particularly of printing machines. The machine has a first gear train, which has several mutually meshing gear wheels of which one is connected with a first drive. A tensioning device produces a torque in the normal rotational direction of the gear wheels between the beginning (first initial wheel) and the end (first end wheel) of the first gear train. The torque is sufficiently great so as to ensure a definite flank alignment of the gear wheels is each machine position.

2. Description of the Related Art

A device of the foregoing type is known from German published, non-prosecuted application 17 61 078. Its purpose is to coordinate the timing of the various cylinders of rotary printing machines, particularly of color printing machines, and to connect them without play. A torque is produced in the direction of rotation of the gear wheels by means of a tensioning device. The tensioning device is disposed between the beginning and the end of a gear train and helps avoids gear flank changes or an interruption in the alignment of the gear flanks. These occur, for instance, in the case of torque fluctuations during the operation of the printing machine. Such backlash, also referred to as chattering, can lead to a deviation from the desired coordinated rotational movement of the individual cylinders and even to register inaccuracies. The tensioning device known from the prior art is embodied as a longitudinal shaft which is connected with the beginning and the end of the gear train via suitable gear wheels and which, based on a defined torsion, effects a torque on the individual gear wheels of the gear train. The torque ensures a definite mutual flank alignment among the gear wheels. One of the gear wheels of the known device is connected with a drive, which also drives the rotary printing machine. The tensioning of the longitudinal shaft is very expensive in structural terms and the space requirements are substantial. Furthermore, it is only realized with a single motor drive.

In printing machines with multi-motor drives it is known to apply the main driving force with a motor while the other motor acts as a brake. This causes a definite flank alignment of the gear wheels in a corresponding gear train. Perfect printing results can only be achieved with extreme braking of the braking motor. This, of course, leads to corresponding losses.

It is further known in two-motor drives of printing machines to either accept inaccuracies, such as double print, from flank backlash due to unstable conditions or to provide a complicated control of the two motors. Such a control necessitates expensive and difficult measurements of the power flow. Even though, optimal printing results are not assured in each operating condition.

SUMMARY OF THE INVENTION

It is accordingly an object of the invention to provide a device for avoiding flank backlash in gear trains, which overcomes the hereinafore-mentioned disadvantages of the heretofore-known devices of this general type and which is best applicable and which delivers optimally in machines provided with multi-motor drives.

With the foregoing and other objects in view there is provided, in accordance with the invention, a device for avoiding gear flank backlash, comprising
- a first gear train including a plurality of mutually meshing gear wheels with a first initial wheel and a first end wheel, and means for driving the first initial wheel;
- a second gear train including a plurality of mutually meshing gear wheels with a second initial wheel and a second end wheel, and means for driving the second end wheel;
- means for selectively rotatably and non-rotatably connecting the first initial wheel of the first gear train with the second initial wheel of the second gear train; and
- tensioning means connected between the first and second end wheels for producing a torque in a rotational direction of the gear wheels of the first gear train between the first initial wheel and the first end wheel for ensuring definite flank alignment of the gear wheels during operation of the first gear train.

In other words, the gear wheel connected with the first drive forms the first initial wheel, which is non-rotatably connected with a second initial wheel of a second gear train. The wheel of the second gear train which forms a second end wheel is coupled with the first end wheel via the tensioning device. Furthermore, it is connected with a second drive. This configuration leads to a closing of the force flow in both gear trains. Continual and definite flank alignment of the individual gear wheels is thus ensured.

The drive energy of the first drive is directly fed to the first initial wheel of the first gear train and from there it is guided to the further gear wheels of the first gear train. Since the second drive is non-rotatably connected with the end wheel of the second gear train, and since the initial wheel of the second gear train is non-rotatably coupled with the first initial wheel of the first gear train, the force flow from the second drive runs via the individual gear wheels of the second gear train, with a definite flank alignment, up to the first initial wheel of the first gear train. From there it runs to the individual gear wheels of the first gear train, which also exhibit definite flank alignment in any machine position and operating condition due to the mutual tensioning and clamping of the two gear trains.

The structural configuration according to the invention with two gear trains requires relatively small structural expense and only little space. The degree of efficiency of the device according to the invention is very high and it has proven to be superior over the above-mentioned solution with the braking drive, in which the electrical braking power is fed back.

In accordance with an added feature of the invention, each of the plurality of gear wheels of the second gear train is associated with a respective one of the plurality of gear wheels of the first gear train.

In accordance with an additional feature of the invention, each of the respectively associated gear wheels of the first and second gear trains are substantially identical.

In accordance with a further feature of the invention, each of the gear wheels of the first and second gear trains are mounted rotatably about respective axes, each of the axes of the gear wheels of the second gear train being aligned with a respective one of the axes of the gear wheels of the first gear train.

In accordance with again an added feature of the invention, the gear wheels disposed between the first initial wheel and the first end wheel of the first gear train form first middle wheels and the gear wheels disposed between the second initial wheel and the second end wheel of the second gear train form second middle wheels, and including axles supporting the middle wheels and being non-rotatably connected to said first middle wheels.

In accordance with again an additional feature of the invention, the axles are formed of axle stubs or journals formed on the first middle wheels of the first gear train.

In accordance with again another feature of the invention, respective ones of the second middle wheels are carried on respective ones of the axle stubs with a friction bearing.

In accordance with yet an added feature of the invention, the device includes a first split shaft with first and second shaft members connecting the first initial wheel with the second initial wheel, and a coupling for non-rotatably coupling the first and second shaft members.

In accordance with yet another feature of the invention, the device includes a second split shaft with first and second shaft members, the tensioning means being connected between and coupling the first and second shaft members.

In accordance with concomitant features of the invention, the afore-mentioned tensioning means is in the form of a rotationally elastic connecting device such as, for instance, a torsion bar which effects the necessary torque on the gear wheels.

With the above-noted and other objects in view, there is provided, in accordance with the invention, an improvement in a configuration for avoiding backlash of gear flanks in a gear train of a printing machine, the printing machine having a first gear train with a plurality of mutually meshing gear wheels, one of the gear wheels being driven by a first drive, and a tensioning device for introducing a torque between an initial wheel of the gear train and an end wheel of the gear train, the torque being applied in a preferred rotational direction of the first gear train and causing a definite flank alignment among the gear wheels. The improvement comprises a second gear train with a plurality of mutually meshing gear wheels aligned between a second initial wheel and a second end wheel, means for connecting the initial wheel of the first gear train with a drive means and for selectively rotatably and non-rotatably connecting the initial wheel of the first gear train with the second initial wheel of the second gear train, a tensioning device connected between the second end wheel of the second gear train and the end wheel of the first gear train, and means for connecting the second end wheel of the second gear train with a second drive.

In summarizing several of the added embodiments of the invention, it is also proposed to associate each gear wheel of the first gear train with a gear wheel of the second gear train. In particular, the mutually associated gear wheels of the first and second gear trains may be formed identically. This identical structure (same diameter, same number of teeth, etc.) of the gear wheels of the two gear trains results in a very simple, symmetrical construction.

The structure is optimized when the axes of the gear wheels of the second gear train are aligned with the axes of the gear wheels of the first gear train. It is especially preferable when the gear wheels of the second gear train—except for the second initial wheel and the second end wheel—are mounted on axles which are non-rotatably connected with the corresponding gear wheels of the first gear train. This is especially the case when the axles of the gear wheels of the second gear train which lie between the first initial wheel and the second end wheel (middle wheels) are formed of axle stubs or journals on the corresponding gear wheels of the first gear train. The stubs are non-rotatably connected with the corresponding gear wheels of the first gear train. Insofar, no essential relative movement occurs during operation between the respectively associated gear wheels. This allows a relatively simple and thus not very expensive construction. In particular, the mounting on the stubs can be formed as a friction bearing, i.e. no expensive ball bearings are required.

In another embodiment the first initial wheel is connected to the second initial wheel through a first split shaft. Two (first) shaft members can thereby be non-rotatably coupled via a coupling or clutch. This construction makes it possible to wind up the tensioning device with at least one of the drives when the coupling is open. When the tensioning device is fulled tensed, i.e. the full required torque is stored therein, the coupling is closed. Depending on the applied tensioning force, a correspondingly great torque builds up between the two gear trains. The torque is what ensures the definite and consistent flank alignment of the individual gear wheels of the two gear trains.

Other features which are considered as characteristic for the invention are set forth in the appended claims.

Although the invention is illustrated and described herein as embodied in a device for avoiding flank backlash in gear trains, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
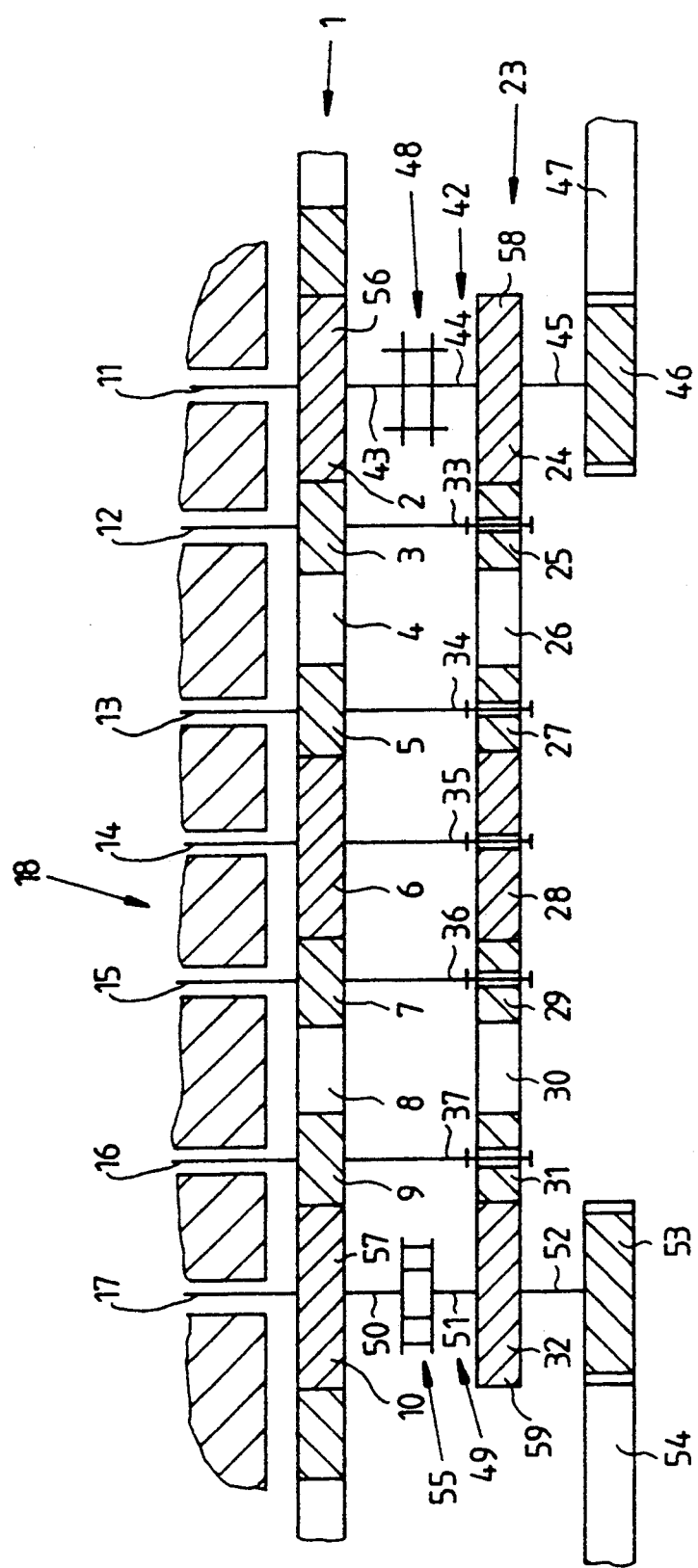
FIG. 1 is a schematic cross-sectional view of two gear trains of a printing machine, particularly an offset present machine, the section taken along the line I—I in FIG. 2.

Referring now to the figures of the drawing in detail and first, particularly, to FIG. 1 thereof, there is seen a first gear train 1 at a non-illustrated printing machine. The gear train 1 has mutually meshing gear wheels 2 to 10. The gear wheels 2, 3, 5, 6, 7, 9 and 10 are torsionally fixed to shafts 11 to 17. These shafts are supported in a machine frame 18 of the printing machine and they are coupled with respective, non-illustrated cylinders of the printing machine. Corresponding shafts carrying the gears 4 and 8 are also provided, but they are not illustrated in FIG. 1 for reasons of simplicity.

Figure 2:
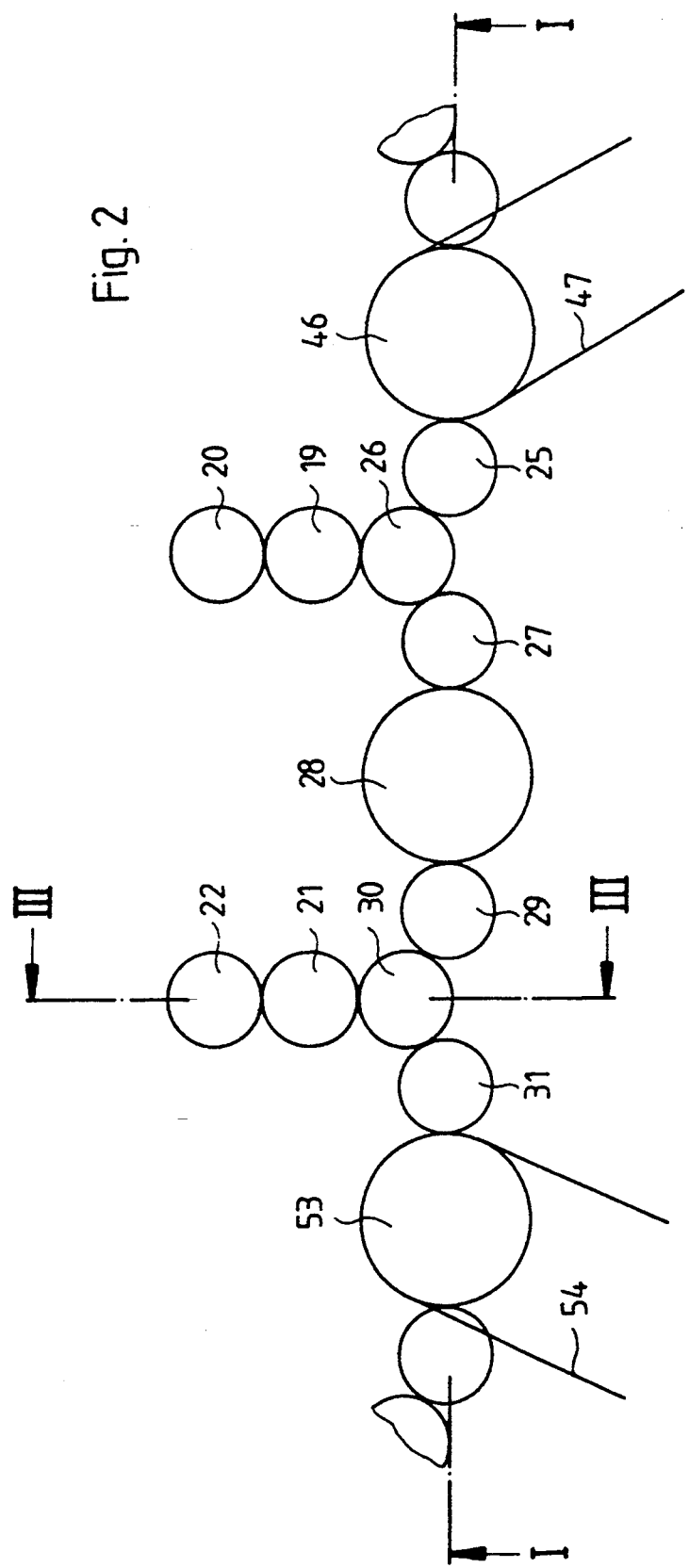
FIG. 2 is a schematic side view of the drive side of the printing machine.

With reference to FIG. 2, two further gear wheels 19 and 20, respectively 21 and 22, are disposed above the gear wheels 4 and 8. The gear wheels 4 (covered from view by the gear 26 in the figure), 19 and 20 mesh with one another and the gear wheels 8 (covered up by the gear 30), 21 and 22 mesh with one another. The gear wheel 4 drives an impression cylinder, the gear wheel 19 drives a rubber blanket cylinder and the gear wheel 20 drives a plate cylinder of a first printing unit of the printing machine. The gear wheel 8 drives an impression cylinder, the gear wheel 21 drives a rubber blanket cylinder and the gear wheel 22 drives a plate cylinder of a further printing unit of the printing machine.

Again referring to FIG. 1, the printing machine has a second gear train 23, which is disposed parallel to the first gear train 1 and which is formed of mutually meshing gear wheels 24 to 32. The gear wheel 2 is thereby assigned to or associated with the gear wheel 24, the gear wheel 3 with the gear wheel 25, the gear wheel 4 with the gear wheel 26, the gear wheel 5 with the gear wheel 27, the gear wheel 6 with the gear wheel 28, the gear wheel 7 with the gear wheel 29, the gear wheel 8 with the gear wheel 30, the gear wheel 9 with the gear wheel 31, and the gear wheel 10 is associated with the gear wheel 32. The gear wheel 24 is identical to the gear wheel 2 in terms of diameter and number of teeth. The same holds true for the other mutually associated gear wheels of the two gear trains 1 and 23. The gear wheels 3, 5, 6, 7 and 9 are provided with axle stubs or journals 33, 34, 35, 36 and 37, respectively. The stubs are disposed at the sides opposite from the shafts 12, 13, 14, 15 and 16 and they are oriented coaxially therewith. While the shafts 12, 13, 14, 15 and 16 and the axle journals 33, 34, 35, 36 and 37 are non-rotatably, i.e. torsionally rigidly, connected with the respectively associated gear wheels 3, 5, 6, 7 and 9, the gear wheels 25, 27, 28, 29 and 31 are rotatably mounted on the axle journals 33 to 37, respectively.

Figure 3:
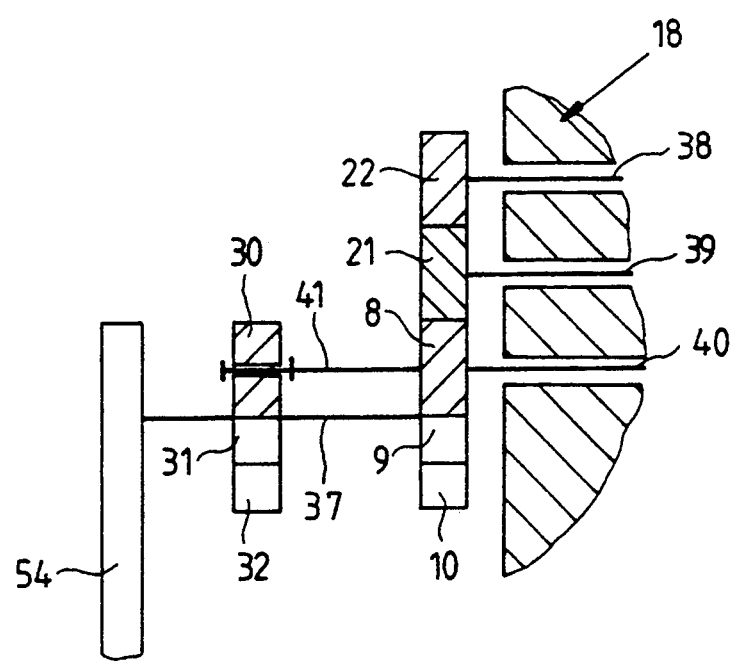
FIG. 3 is a sectional view taken along the line III—III in FIG. 2.

With reference to FIG. 3, the same holds true for the remaining gear wheels 4 and 8, as well as 26 and 30 (FIG. 3 illustrates only the structure in the region of the gear wheels 8 and 30; a similar configuration is found for the gear wheels 4 and 26). It can be seen that the gear wheel 22 is supported on the machine frame 18 by a shaft 38. The gear wheel 22 meshes with the gear wheel 21, which is provided with a shaft 39. The gear wheel 8, which meshes with the gear wheel 21, is non-rotatably connected with a shaft 40, which is supported in the machine frame 18 and it is provided with an axle journal 41 on the side which extends oppositely from the shaft 40. The axle journal at 41 is non-rotatably fastened to the gear wheel 8 and it is coaxially aligned with the shaft 40. The gear wheel 30 is rotatably mounted on the axle journal 41.

Again referring back to FIG. 1, the gear wheel 2 is non-rotatably mounted on the shaft 11. On the other side of the gear wheel 2, coaxially aligned with the shaft 11, there is provided a first split shaft 42. The shafts 11 and 42 are thus coaxial. A first shaft member or part 43 of the split shaft 42 is non-rotatably connected with the gear wheel 2. Another shaft member 44 of the split shaft 42 is non-rotatably connected with the gear wheel 24. On the side of the gear wheel 24 which is opposite from the shaft part 44, an axle journal 45 is non-rotatably connected with the gear wheel 24 at one end thereof, and it is non-rotatably connected to a belt pulley 46 at the other end thereof. The pulley 46 is thereby overhung mounted (taper bore mounted). A drive belt 47 wraps about the pulley 46. The belt 47 connects to a non-illustrated first drive (for instance an electric motor). The two first shaft members 43 and 44 can be non-rotatably coupled by means of a coupling 48.

A corresponding structure applies to the gear wheels 10 and 32. In that case, the shaft 17 carries the gear wheel 10 rotatably on the machine frame 18. On the other side of the gear wheel 10 there is disposed a second split shaft 49, with second shaft members 50 and 51. One end of the second shaft member 50 is non-rotatably attached to the gear wheel 10 and it is coaxially aligned with the shaft 17. The other second shaft member 51 is non-rotatably attached to the gear wheel 32 at one end. An axle stube or journal 52 is located on the side of the gear wheel 32 which is opposite from the shaft member 51. The axle stub 52 is non-rotatably attached at the gear wheel 32 and it is coaxially aligned with the shaft 49. One end of the stub 52 carries a pulley 53 in an overhung fashion; the pulley is wrapped with a drive belt 54, which is connected to a non-illustrated second drive. That drive is preferably embodied as an electro-motor as well. The two free ends of the two shaft members 50 and 51 are mutually connected through a tensioning or clamping device 55, which forms a rotationally-elastic connection. It may, for instance, be embodied as a torsion bar.

Again with reference to FIG. 3, a comparision between the first gear train 1 and the second gear train 23 shows that only the gear wheel 8 is provided with an associated gear wheel 30. The gear wheels 21 and 22 of the first gear train 1 do not have any associated gear wheels of the second gear train. This is not necessary, because the gear wheel 30 is sufficient to close the force flux in the second gear train 23. This is also true for the gear wheels 4 and 26.

Returning to FIG. 1, the gear wheel 2 of the first gear train 1 forms a first initial wheel 56 and the gear wheel 10 at the end of the first gear train 1 forms a first end wheel 57. Correspondingly, the gear wheel 24 of the second gear train 23 forms a second initial wheel 58 and the gear wheel 32 forms a second end wheel 59. The gear wheels disposed between the initial and end wheels may be referred to a middle wheels, i.e. first middle wheels of first gear train and second middle wheels of the second gear train.

The operation of the device requires an initiation in which the two gear trains 1 and 23 are tensed or wound up relative to one another. For this purpose, the first gear train 1 is turned relative to the second gear train 23 while the coupling 48 is open or disengages. This causes the clamping device 55 to be tensed. When the tense condition is attained, then the coupling 48 is closed. That condition may also be referred to as the biased condition, as the tensioning or torsion device 55 is fully biased. The tensioning device 55 now subjects the entire structure to a torque, which causes all of the gear wheels to assume a definite flank alignment. The torque is chosen at such a magnitude which assures that the definite flank alignment is maintained in all machine operations. The force introduction from the first drive is effected via the drive belt 47, the pulley 46, the shaft 45 and via the gear wheel 24. Then via the first split shaft 42, which is closed by means of the coupling 48, and onto the gear wheel 2, i.e. onto the first gear train 1.

Drive power from the second drive is fed in through the drive belt 54 onto the pulley 53, and from there onto the gear wheel 32 of the second gear train 23 via the axle stub 52. The second gear train 23 transfers the drive power of the second drive via its gear wheels 32, 31, 30, 29, 28, 27, 26 and 25 to the gear wheel 24, which—as already mentioned—also transfers the force to the first gear train 1 via the first split shaft 42.

Since the axle journals supporting the individual gear wheels of the second gear train 23, the first split shaft 42 and the second split shaft 49 rotate with a rotation of the corresponding gear wheels of the first gear train 1, no essential relative movements will occur between those elements and the respectively associated gear wheels of the second gear train 23. This means that a friction or sliding bearing suffices for the corresponding gear wheels of the second gear train 23. Also, friction losses in the second gear train 23 are minimized, which improves the degree of efficiency.

I claim:

1. Device for avoiding gear flank backlash, comprising
   a first gear train including a plurality of mutually meshing gear wheels with a first initial wheel and a first end wheel, and means for driving said first initial wheel;
   a second gear train including a plurality of mutually meshing gear wheels with a second initial wheel and a second end wheel, and means for driving said second end wheel;
   means for selectively rotatably and non-rotatably connecting said first initial wheel of said first gear train with said second initial wheel of said second gear train; and
   tensioning means connected between said first and second end wheels for producing a torque in a rotational direction of said gear wheels of said first gear train between said first initial wheel and said first end wheel for ensuring definite flank alignment of said gear wheels during operation of said first gear train.

2. The device according to claim 1, wherein each of said plurality of gear wheels of said second gear train is associated with a respective one of said plurality of gear wheels of said first gear train.

3. The device according to claim 2, wherein each of said respectively associated gear wheels of said first and second gear trains are substantially identical.

4. The device according to claim 1, wherein each of said gear wheels of said first and second gear trains are mounted rotatably about respective axes, each of said axes of said gear wheels of said second gear train being aligned with a respective one of said axes of said gear wheels of said first gear train.

5. The device according to claim 1, wherein said gear wheels disposed between said first initial wheel and said first end wheel of said first gear train form first middle wheels and said gear wheels disposed between said second initial wheel and said second end wheel of said second gear train form second middle wheels, and including axles supporting said middle wheels and being non-rotatably connected to said first middle wheels.

6. The device according to claim 5, wherein said axles are formed of axle stubs formed on said first middle wheels of said first gear train.

7. The device according to claim 6, wherein respective ones of said second middle wheels are carried on respective ones of said axle stubs with a friction bearing.

8. The device according to claim 1, including a first split shaft with first and second shaft members connecting said first initial wheel with said second initial wheel, and wherein said means for selectively rotatably and non-rotatably connecting are in the form of a coupling for coupling said first and second shaft members.

9. The device according to claim 1, including a second split shaft with first and second shaft members, said tensioning means being connected between and coupling said first and second shaft members.

10. The device according to claim 1, wherein said tensioning means are formed by a torsion bar causing the torque on said gear wheels.

11. The device according to claim 1, wherein said tensioning means are formed by a rotationally elastic connecting device.

12. In a configuration for avoiding backlash of gear flanks in a gear train of a printing machine, the printing machine having a first gear train with a plurality of mutually meshing gear wheels, one of said gear wheels being driven by a first drive, and a tensioning device for introducing a torque between an initial wheel of said gear train and an end wheel of said gear train, the torque being applied in a preferred rotational direction of the first gear train and causing a definite flank alignment among the gear wheels, the improvement which comprises,
   a second gear train with a plurality of mutually meshing gear wheels aligned between a second initial wheel and a second end wheel, means for connecting the initial wheel of the first gear train with a drive means and for selectively rotatably and non-rotatably connecting the initial wheel of the first gear train with said second initial wheel of said second gear train, a tensioning device connected between said second end wheel of said second gear train and the end wheel of the first gear train, and means for connecting said second end wheel of said second gear train with a second drive.

* * * * *